Figure 1:
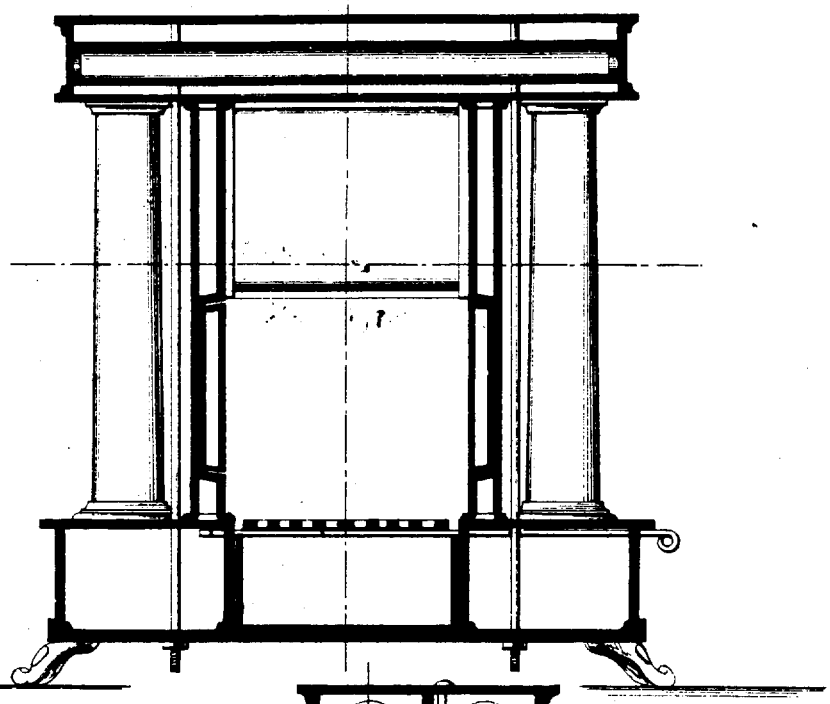
Figure 3:
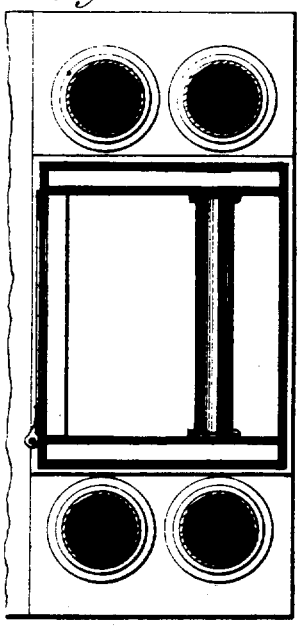
Figure 2:
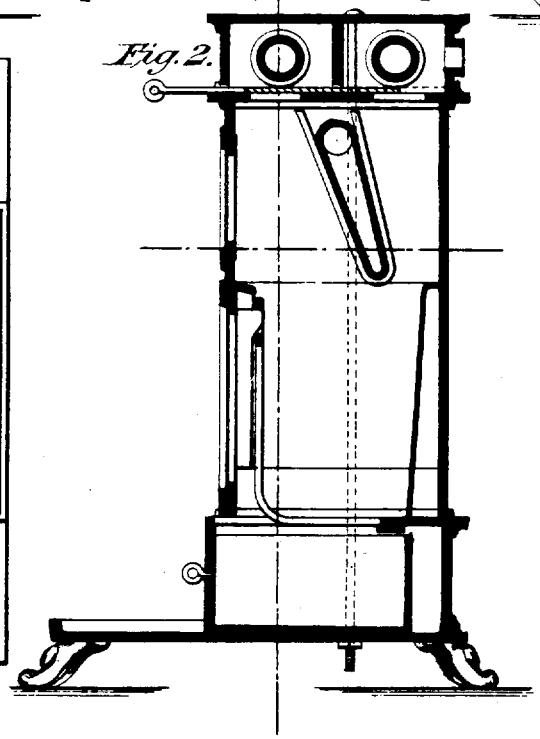

BEST AVAILABLE COPY

J. WILSON.

Heating-Stoves.

84034

Patented Sept. 12, 1834.

N. PETERS, PHOTO-LITHOGRAPHER, WASHINGTON, D. C.

The schedule referred to in these Letters Patent & making part
of the same, containing a description in the words of the said James
Wilson himself of his improvements in the construction of the union or
double grate connected with stoves of various forms & kinds for Bur-
ning Anthracite & Bituminous coal for heating Rooms &c.

---

Wilson's Improved Patent Pyramid hot air Guards Plate
union or double grate stoves for burning all the various kinds of
Anthracite Coal & all other flamable substances with the greatest
economy adapted to all the varieties of situations such as meeting
houses, halls, steamboats, selling Rooms, Counting houses, Kitchen
Stoves, cabins &c &c on an entirely new principle never before known
or used, in the United States.

Description of Improvement. The four corners of the Stove
inside may be formed into hollow squares by means of right
angular cast Iron heaters with triangular Flanges on the inner
edge forming projections for receiving the linings entirely pre-
venting them from inclining towards the Centre & may be inserted
at any time without taking the stove down, & on the surface of
which the action of the fire is intense the linings may be made
of clay, soapstone, or any other suitable material & of all sizes and
forms. one, two three or four flues may be used at the same time
to suit various situations, the flues commencing either in the rear
of the fire or sides, or a level with grate, below or above, causing
the air of the room to pass directly through the fire, thereby gi-
ving the greatest possible draft either with or without a blower
or damper & consumes all the flamable portions of the air. In
the upper part & second chamber of the stove, is a dovetail damp-
er or valve air tight, which is opened & shut at pleasure to let
the smoke & gas pass into the flue in kindling a fire; & when open
to cause all the coal to ignite & burn at the same time; & when
shut to stop ignition above the opening or the flue below the cast iron
plain or dove-tail box in connection with the clay lining. The form of the plates connected with the back or sides of the stove, may be square, along round or
half Rd. one fourth or one eighth of a circle, or any other shape or figure
that will preserve an open cavity between the surface & guards plates which
are within to receive the violence of the fire & prevent injury to the outside
plates or in the least diminishing their beauty. There are openings in the
outside plates & back of the Stove to admit a free circulation of cold air
which is heated by means of the guards dovetails plates or fox & then pas-
ses freely into the room; or it may be constructed by adding a hollow
tube passing round the inner surface of the stove receiving the heated
air from the dovetail flues at the four corners of the Stove or hollow
square, or any form of heaters; it may then be conveyed to any apart-
ment of the building heating with its fumes any portion or portions of
the same with less expense in fuel than any thing heretofore known or
used. The fronts of the different forms & sizes of the above described
stoves may be open, giving the most beautiful fire, equal to the most
1 approved parlour grates & retaining the same economy as the stove above
mentioned, having an open fire with a door or blower in the form of
a window sash resting on hinges or suspended in any other way &
may be removed at pleasure, retaining when in its places all the advan-
tages of those less open by filling the sashes with mica through which
the rays of light may be emitted. The stove may be of any size form
or pattern, the most approved is an oblong square or round, with one or
more stories with urn or spiral tops, the linings may in both cases be
of iron or clay, united or detached with dovetail flanges to receive the
clay in union with the iron. Description of the union or double grate
which is made in two parts of cast or wrought iron or any other suitable
materials, the one half of the bars are connected to the shaft on the cen-
tre on which the grate when united with the other half rests, & is ma[illegible]
a part of the same by fastenings either of screws or rivets, or by any
other means of uniting them firmly together, & yet permit the grate
shaft to vibrate in the outer gudgeon that passes through the side
or front, or is separate from the main shaft, receiving the latter [illegible]
means of a hollow square resting on a collar made fast to the sides by screws or rivets to be removed with ease in order to insert & remove the grate without taking the stove in pieces, by a crank on the side of the stove &c may be used in front with a lever or any other purchase sufficient to detach the ashes from the coal & drop them into the ash pit attached to the shaft by which being moved one fourth of a circle, the coal will be agitated the whole length of the grate at once & the ashes be caused to drop into the pan below, without pulverizing or wasting the coals as is the case with most other grates & on removing the fastenings to the frame part of the grate the whole contents of the chamber of combustion is made to drop into the pan below, by giving the crank a motion equal to one fourth of a circle, or it may be suspended on centres in the form of a right angle, the bars of the grate may be flat or concave.

Summary. I claim as my invention first the union grate as be-fore described, also the manner of discharging the same by describing the quarter of a circle or any segment thereof, or by means either of a swing or drop grate, the same having been used for containing fuel or discharging it by one motion into the ash pan, & resting on the centres with or without half circle, triangular or concave bars, the latter being greatly preferred for strength & convenience of moulding the same being lighter & stronger than the half circle, oblong, or any other form. Second. I claim as my invention the opening in the sides or outer surface of the stove for the admission of air to prevent the iron box or guard plates from being destroyed by the intensity of heat from anthracite or other coal. Third. I claim as my invention & improvement the moveable damper or valve sliding under ovens to prevent extra heat & giving direction to the [illegible] of heat & passing the same up the extra or back flue, at or near the bottom or at the junction of the upper outlet, through the body of the stove into the back flue or chimney; giving perfect direction to the fire & entirely preventing by closing the damper or moveable plate, the surplus heat so much complained of in all other stoves heretofore in use without the damper & castings guard plates or box. Fourth. I claim as my invention the cast
iron guard plates or box, either round, square or any other form, which
are separate from the sides or back of the stove & make a part of the
same by being separate or fastened either by screws, rivets or any other
way so as to make the same air tight, which may be of a circular form or
any segment of a circle, & which when united to the sides or back
will form an open cavity for the circulation of air & also retain the
heat in the room without destroying the guard plates or box; and
prevent any injury to the surface plates, as well as keep any thing
from burning that may chance to come in contact with the outside
of the stove, & also presenting the same beautiful surface as the other
plates. Also in connection with the above described moveable plate
or damper. I claim the upper damper in the chamber of combus-
tion to let off the smoke & gas in making a fire, & to cause the whole
contents of the stove to be ignited at the same time if desired. The
chamber of combustion may be made a part of the said stove or sep-
arate, so as to be removed at pleasure & of any form or size desired,
observing that the same be made air tight that combustion may be pre-
vented when the damper is closed. The hopper or urn may be
made large enough to contain a sufficient quantity of fuel to keep
up combustion for days if required & by raising or lowering the tube
made of iron, clay or soapstone, of any form & suitable size to discharge
the coal at or near the grate, preserving a sufficient distance from
the floor or grate of the furnace to graduate the quantity of coal
to be consumed to any degree of heat wished for. By means of this
tube less than one quart of nut coal can be made to burn & the con-
sumption of fuel confined to any given quantity by raising or low-
ering the same & thus regulating it at pleasure. By one part of
the tube being moveable & sliding upon the outer or inner surface of
the main tube connected with the hopper, receiver or urn, which
may be raised or lowered to increase or diminish the quantity of
fuel to be consumed, observing at the time of using the tube to keep the
upper damper in the chamber of combustion closed to prevent the air from passing through the tube if possible; which can be effected only by having the valve or damper airtight & keeping it constantly closed, especially in the use of the fine or nut coal & when combustion is designed to be kept up for a length of time without replenishing the fuel, & the hopper or urn may be sufficient in size to keep up any given temperature for days. The same construction of hopper as described in the within specification except that the feeders are on the outside of the furnace instead of the centre or inside in order to increase the quantity of fuel to last a length of time if required to keep up the fire without constantly charging the same as in the case with all other furnaces now in use. By which means three or more kinds of coal can be injected to any given point below the mouth of the furnace or cupola, to wit, charcoal in the lower part, coke or Liverpool in the centre, & anthracite at the top or mouth; or any other suitable material can be used. The ore or metal to be melted is suspended over the top of the furnace or cupola in a hopper or reservoir to receive the fire from the top of the furnace heating & drying the ore the better preparing it for the furnace or cupola, as it diminishes the quantity of fuel; gives greater facility in fusing & melting; & producing greater uniformity in the quantity of the iron. By the aid of machinery attached to the hopper at the top of the furnace, the ore can be kept constantly discharging from the hopper into the top of the furnace, & the supply increased or diminished to supply the wants of the furnace, working fast or slow. The same constructed hopper or receiver can be used in or on the outside of any stove for culinary purposes as well as for the purposes above & may be made of any suitable material either sheet or cast iron, copper, tin or of any other substance that may answer.

No. 1 Improvement in the management of heat, as applied to cooking stoves of every form & kind, for all culinary purposes in the use of woods or coals in applying the same to the oven & boilers in the most economical manner, never before known or used, without the usual destruction of the oven plates & dampers, sliding under or revolving outside of said oven, giving a more perfect direction to
the flame conveying it to the entire outside of the boiler, increasing
& diminishing the quantity of heat by shoving the guard plate sliding
under the oven from 2 to 4 Inches, the same to be moved at pleasure
or remain stationary, to suit the point of heat in the oven for baking
boiling, roasting or any other purpose. the above guard plate resting
on flanges cast on the inner lower edge of the side oven plate sufficient
distance from the bottom oven plate to pass all the flame, or fumes of
heat between the guard plate & the bottom oven plate if required or
any part of it, the guard plate giving perfect direction & imparting
any portion of fire for the purpose above named, by means of a han-
dle piercing through the outside of the stove, or may be used by any
other suitable instrument resting on or between the flanges cast on the
under side of the guard plate for that purpose, near the front lower
side. the same sliding damper is used in tining sheets of copper
directing the fire to & from the sheets in its passage in the sheet iron
tube & having discovered the great inconvenience of the former
plan & exposure of the former sliding damper under the ovens of
cooking stoves, its destruction by intense heat to which they were ex-
posed & the manner they were made to act under the oven, have
substituted the following sliding or revolving damper resting on a
wide flange cast on & making a part of the upright side oven
plate from one to six inches more or less, at right angles, with the
upright side oven plates, themselves forming an imperishable
guard plate to the dampers sliding or revolving on the upper side
of the same the fire passing under the guard [illegible] projecting wing
of the upright side oven plates, the said projecting part of said
plate to extend to nearly the outer surface of the stove conveying
the flame or fumes of heat to the outside of the boiler, thereby con-
suming much less fuel than any other stove of like construction
known or used before, & by means of stops cast on the sides of the
stove to receive the damper as it revolves, any given quantity of
heat, may be applied to the boiler by its motion if required, and by passing the fire under the surface of the projecting wing of the
upright side oven plate is heated more effectually than formerly,
with great economy in carrying the flame or fumes from its for-
mer course to the outside of the boiler, the same right angle plate
cast on & making a part of the top or bottom oven plate, to all kinds
of coal stoves plates, such as stove bottoms backs &c, when the action of the
fire is confined to a certain or small portion of the plate. moveable curve
plate forming at pleasure an inclined plane to convey the coal from
the feeder to the side near the front of stove. the improvement herein
described consists, first in the resting or sliding guard plate cross or
lengthways of the oven in cooking stoves on flanges cast on the inside
upright oven plates one or more inches below the bottom of oven leav-
ing sufficient space to pass the flames & fumes of heat between
the oven plate & damper, the heat to the bottom or diminishing it
at pleasure by the motion of the plate from two to four inches from
front to rear under the oven, the same damper is used in turning
apples. connected with said upright side oven plate is a right an-
gle or wings cast on & making a part of said side oven plates upon
which the sliding damper rests on the upper side of the same, sav-
ing the damper from injury by fire as heretofore, giving direction to
the fire to the outside of the boiler, consuming much less fuel & secur-
ing a regular degree of heat to the oven not before known or used.
Having recently discovered by various experiments that cast iron
plates upon which the fire acts upon a part of the surface is saved
from breakage by turning it the thickness of the plate on the sunk bottom
of all kinds of [illegible] for cooking 6 & 9 plate & box stoves, bottoms, all
fire plates & backs to Franklins, heretofore with straight or level plates,
by turning them are entirely prevented from breakage by fire as heretofore,
the same right angle plates are attached to the top & bottom oven plate
& forming an entire fire plate in front of all coal or wood cooking stoves,
gives additional heat to the top & bottom oven plate in baking or frying.
Having discovered the great advantage in burning anthracite coal
in all Pyramid stoves, of all sizes & forms especially the oblong square by reaching the flue in the rear of fire from the front or cham-
ber of combustion by an open space between them for the pur-
pose of forming a chamber for the circulation of air to be heated
to economise further consumption of fuel & to prevent entirely preven-
ting them melting with fire. By various experiments recently
made have discovered a new plan [illegible] in the formation of all cast
iron plate where the action of the fire is intense in any part or sec-
tion of it & not all of the surface, such as sunk bottoms to cook
stoves &c, by carrying the surface of the same at least the thick-
ness of the plate by expansion it increases its convexity & returns a-
gain to its former state without breakage or the least injury to the
plates, backs to Franklins & all other cast plates exposed in part to
the action of the fire heretofore made with a flat or straight sur-
face are now made convex more or less & prevent breakage as here-
tofore.

Summary

No 3 I claim as my invention & improvement the invention of guar-
ding the oven of all cooking stoves from burning at bottom by a stationary
or moveable plate under oven for all culinary purposes giving any por-
tion of heat to the same in baking, frying &c. 2d I claim as my inven-
tion & improvement the flange or wing at right angles with the upright
side oven plate extending outwards from one to six inches more or
less to carry the fire to the outside of the boiler & to provide for the heat-
ing of the upright part of said side oven plate by the action of the fire
under the surface of projecting part of said plate, the revolving damper
resting on the same & preventing its destruction by fire. 3d I claim
the application of said sliding guard plate in connection with a new-
ly constructed sheet iron or any other formed flue for tinning sheets
of copper, thereby regulating the action of the fire to the same at
pleasure. 4th I claim as my invention & improvement the guard
or projecting plate making a part bottom or top oven to upright side
oven as above forming an entire new protection to the sliding or
revolving guard plate & damper saving the same from the usual
destruction by its revolving on its upper surface shielding the same from fire. 5th I claim as my invention & discovery the saving from breakage all stoves or cast iron plates by curbing the same at least the thickness of the metal of the outer surface plate of each division by opening the sides of the stoves or in the bottom & top plates.

Witnesses
C. H. Van Vorhis
Isaac Adriance

James Wilson

Exd. Mg. 6.

(3800 words)

(Patented September 12, 1834.)